(12) United States Patent
Hirai et al.

(10) Patent No.: US 8,211,202 B2
(45) Date of Patent: *Jul. 3, 2012

(54) GAS-ABSORBING SUBSTANCE, GAS-ABSORBING ALLOY AND GAS-ABSORBING MATERIAL

(75) Inventors: Chie Hirai, Shiga (JP); Kazutaka Uekado, Hyogo (JP); Akiko Yuasa, Kyoto (JP); Akihiro Nozue, Osaka (JP); Hideyuki Okumura, Kyoto (JP); Keiichi Ishihara, Kyoto (JP); Eiji Yamasue, Kyoto (JP)

(73) Assignees: Panasonic Corporation, Osaka (JP); Kyoto University, Kyoto (JP)

( * ) Notice: Subject to any disclaimer, the term of this patent is extended or adjusted under 35 U.S.C. 154(b) by 1131 days.

This patent is subject to a terminal disclaimer.

(21) Appl. No.: 11/795,307

(22) PCT Filed: Jan. 13, 2006

(86) PCT No.: PCT/JP2006/300330
§ 371 (c)(1),
(2), (4) Date: Dec. 20, 2007

(87) PCT Pub. No.: WO2006/075680
PCT Pub. Date: Jul. 20, 2006

(65) Prior Publication Data
US 2009/0169869 A9    Jul. 2, 2009

(30) Foreign Application Priority Data

Jan. 14, 2005 (JP) .................. 2005-007298
Mar. 25, 2005 (JP) .................. 2005-087994
Dec. 5, 2005 (JP) .................. 2005-350318

(51) Int. Cl.
*B22F 1/00* (2006.01)
*H01J 7/18* (2006.01)
*H01K 1/56* (2006.01)

(52) U.S. Cl. ............ 75/252; 252/181.4; 252/181.7; 502/400

(58) Field of Classification Search .......... 75/252; 252/181.4, 181.7; 502/400
See application file for complete search history.

(56) References Cited

U.S. PATENT DOCUMENTS

| | | | | |
|---|---|---|---|---|
| 3,114,469 A | * | 12/1963 | Francis et al. | ........... 220/592.27 |
| 3,993,811 A | * | 11/1976 | Walles | ............. 428/35.9 |
| 4,512,960 A | | 4/1985 | Szwarc | |
| 5,102,673 A | * | 4/1992 | Sugihara et al. | ............. 426/124 |
| 5,312,606 A | | 5/1994 | Boffito et al. | |
| 5,399,246 A | | 3/1995 | Joshi | |
| 5,544,490 A | | 8/1996 | Manini et al. | |
| 5,600,957 A | | 2/1997 | Manini et al. | |
| 5,725,795 A | | 3/1998 | Kashiba | |
| 5,762,132 A | | 6/1998 | Evans et al. | |
| 5,885,682 A | * | 3/1999 | Tanimoto et al. | ............... 428/69 |
| 6,074,494 A | | 6/2000 | Miura et al. | |
| 6,076,727 A | | 6/2000 | Evans et al. | |
| 6,146,225 A | | 11/2000 | Sheats et al. | |
| 6,521,014 B2 | | 2/2003 | Toia et al. | |

FOREIGN PATENT DOCUMENTS

| | | |
|---|---|---|
| DE | 69630034 | 11/1996 |
| DE | 197 13 237 | 11/1997 |
| DE | 69808761 | 12/1998 |
| DE | 69806649 | 4/2000 |
| EP | 0832501 | 4/1998 |
| EP | 0990954 | 4/2000 |
| EP | 1114198 | 7/2001 |
| EP | 1129027 | 9/2001 |
| EP | 1 600 232 | 11/2005 |
| GB | 2341612 | 3/2000 |
| JP | 5-131134 | 5/1993 |
| JP | 2627703 | 5/1993 |
| JP | 3252866 | 9/1993 |
| JP | 6-135707 | 5/1994 |
| JP | 9-157829 | 6/1997 |
| JP | 9-512088 | 12/1997 |
| JP | 2002-129208 | 5/2002 |
| JP | 2003-535218 | 11/2003 |
| WO | 2005/107334 | 11/2005 |

OTHER PUBLICATIONS

German Patent Office Official Action dated Sep. 11, 2008 for German Patent Application No. 11 2006 000279.1.
English translation of German Official Action issued Apr. 27, 2010 in corresponding German Patent Application No. 11 2006 000 279.1-43.
German Patent Office Summons issued Apr. 10, 2012 in corresponding German Patent Application No. 11 2006 000 279.1, with English translation.
Legierung, excerpt from ROEMPP Online, Version 3.22 (advisory) 2012, with English translation.

\* cited by examiner

*Primary Examiner* — Roy King
*Assistant Examiner* — Ngoclan T Mai
(74) *Attorney, Agent, or Firm* — Wenderoth, Lind & Ponack, L.L.P.

(57) ABSTRACT

The present invention relates to a gas-absorbing substance that contains at least Li and a solid material having a hardness of 5 or more, and absorbs at least nitrogen or oxygen at 25° C. under normal pressure, and a gas-absorbing alloy that contains at least two kinds of metals that are not allowed to mutually form an intermetallic compound, with a mixing enthalpy of the two kinds of metals being greater than 0 and at least one portion of the two kinds of metals being atomically mixed, and also concerns a gas-absorbing material that contains the gas-absorbing substance and the gas-absorbing alloy.

5 Claims, 8 Drawing Sheets

Fig. 1

2 Gas-absorbing substance

GAS-ABSORBING SUBSTANCE, GAS-ABSORBING ALLOY AND GAS-ABSORBING MATERIAL

DETAILED DESCRIPTION OF THE INVENTION

1. Technical Field of the Invention

The present invention relates to a gas-absorbing substance, a gas-absorbing alloy and a gas-absorbing material containing the gas-absorbing substance and/or the gas-absorbing alloy (hereinafter, collectively referred to as "gas-absorbing substance etc.").

2. Background Art

The gas-absorbing substance etc. are used in various fields such as maintaining vacuum, eliminating trace gases in a rare gas and removing gases from a fluorescent lamp.

With respect to rare gases used in the semiconductor manufacturing industry, there have been strong demands for removing gases, such as nitrogen, hydrocarbons, carbon monoxide, carbon dioxide, oxygen, hydrogen and water vapor, from a rare gas so as to be purified with high purity. In particular, among these, it is difficult to remove nitrogen that has the most stable molecule.

With respect to the conventional method of eliminating nitrogen or hydrocarbons in a rare gas, for example, a method in which a getter material, made of a ternary alloy constituted by zirconium, vanadium and tungsten, and the rare gas are allowed to contact with each other under heat has been proposed (for example, see Patent Document 1).

In this method, the alloy is made in contact with a rare gas at a temperature in a range from 100 to 600° C. so that impurities such as nitrogen are removed from the rare gas.

With respect to another conventional method, a method has been proposed in which a non-evaporation getter alloy that contains zirconium, iron, manganese, yttrium, lanthanum and at least one element selected from a rare-earth element, and has a high gas-absorbing rate on nitrogen is used (for example, see Patent Document 2).

In this method, the alloy is subjected to an activating process for 10 to 20 minutes at a temperature in a range from 300 to 500° C. so that it is allowed to absorb hydrogen, hydrocarbons, nitrogen and the like even at room temperature.

In still another conventional method, a Ba—Li alloy having a property for absorbing nitrogen at a low temperature is used (for example, see Patent Document 3).

This method relates to a device used for maintaining a vacuum inside a heat-insulating jacket, which contains a Ba—Li alloy and exerts a reactivity on gases such as nitrogen even at room temperature.

This utilizes a nitrogen absorbing reaction by Ba, and it is described that Na or K other than Li may also be used without causing any problem.

A material constituted by iron powder, an oxidization accelerating substance, a filler and a moisture donor is used as an oxygen absorbing agent (for example, see Patent Document 4).

This oxygen absorbing agent is utilized for a quality-maintaining purpose in foodstuffs, medical products and the like, and moisture is required upon absorbing oxygen.

[Patent Document 1] Japanese Patent Application Laid-Open No. 6-135707
[Patent Document 2] Japanese Patent Application National Publication (Laid-Open) No. 2003-535218
[Patent Document 3] Japanese Patent No. 2627703
[Patent Document 4] Japanese Patent No. 3252866

DISCLOSURE OF THE INVENTION

Problems to be Solved by the Invention

In the above-mentioned conventional technique in Patent Document 1, however, it is necessary to continuously heat at 300 to 500° C., with the result that the high-temperature heating process causes greater energy costs with adverse effects to the environment, and this technique cannot be applied when a gas-absorbing process at a low temperature is desired.

In the above-mentioned technique in Patent Document 2, a preprocess to be carried out at a temperature in a range from 300 to 500° C. is required, and this process is hardly applicable to a gas-removing operation in which a high-temperature preprocess is unavailable, for example, an operation in which gases in a plastic bag need to be removed at normal temperature.

In the above-mentioned conventional technique in Patent Document 3, although a nitrogen-absorbing process at normal temperature is available without the necessity of a heating process for activation, there are demands for a higher activity with a larger capacity, and since Ba is a highly poisonous designation substance, a safer substance without causing any problems in the environment and the human body is desired upon industrial application.

Moreover, upon manufacturing, the alloy needs to be fused consequently to require greater energy in the production process.

In the above-mentioned conventional technique in Patent Document 4, moisture is required upon absorbing oxygen, with the result that it is not used in an atmosphere in which even trace moisture is inhibited.

The present invention has been made so as to solve the above-mentioned conventional problems, and its objective is to provide a gas-absorbing substance that have a high gas-absorbing activity and, in particular, exerts a high absorbing function on nitrogen and/or oxygen so that nitrogen and/or oxygen can be absorbed at normal temperature under normal pressure, or even at normal temperature under a reduced pressure.

Another objective of the present invention is to provide a gas-absorbing substance etc. that cause no problems on the environment and the human body.

Means to Solve the Problems

In order to achieve the above-mentioned objective, the present invention provides a gas-absorbing substance that contains at least Li and a solid material having a hardness of 5 or more and absorbs at least nitrogen or oxygen at 25° C. under normal pressure, a gas-absorbing alloy which is constituted by at least two kinds of metals that are not allowed to mutually form an intermetallic compound, with a mixing enthalpy of the two kinds of metals being greater than 0 and at least one portion of the two kinds of metals being atomically mixed with each other, and a gas-absorbing material that contains the above-mentioned gas-absorbing substance and the gas-absorbing alloy.

BEST MODE FOR CARRYING OUT THE INVENTION

First, the following description will discuss the gas-absorbing substance that contains at least Li and a solid material having a hardness of 5 or more and absorbs at least nitrogen or oxygen at 25° C. under normal pressure.

Li normally becomes inactive because of the formation of a coat film on the surface, or the like, and is not allowed to absorb nitrogen or oxygen.

However, the hardness of Li is 0.6 and a solid material having a hardness of 5 or more is made to coexist therewith. The solid material mills Li so that the surface of Li is shaved and allowed to have a newly formed active surface. Therefore, it becomes possible to absorb nitrogen and/or oxygen quickly at normal temperature.

The gas-absorption substance of the present invention is preferably designed so that the solid material is an oxide, or contains at least an oxide.

The use of an oxide allows oxygen on the surface of the oxide to spuriously form a temporary coupling with Li; therefore, upon conducting, for example, a pulverizing process or a compression-joining process, Li is also effectively pulverized together with the oxide pulverized so that it is considered that Li is activated.

In the gas-absorbing substance of the present invention, at least one portion of Li is preferably made to have a particle size of 1 mm or less.

By setting the particle size to 1 mm or less, not only the outer layer of Li, but also the inside of Li is made susceptible to nitriding or oxidizing so that the amount of gas absorption per Li increases, making it possible to effectively utilize the material.

In the gas-absorbing substance of the present invention, at least Li and one portion of the solid material are preferably atomically mixed with each other.

It is considered that Li and one portion of the solid material are made compatible with each other so that the interface increases and the activity is consequently improved.

The gas-absorbing substance of the present invention is preferably designed so that at least Li and the solid material are mixed through a mechanical alloying process.

By carrying out the mechanical alloying process, Li and the solid material are milled and mixed with high energy so that the grinding effect exerted on Li by the solid material is improved, thereby increasing the effects of exposing the Li newly-formed surface and of segmentalizing Li. Since the solid material is also ground and segmentalized, Li is more effectively divided and segmentalized.

By carrying out the mechanical alloying process, mechanical energy is accumulated in Li and the solid material so that it is considered that the energy possessed after the mechanical alloying process becomes greater than the energy possessed at the time of starting to form a higher activated state.

Since the manufacturing process through the above-mentioned method requires no fusing process or the like to eliminate the necessity of thermal energy, the process is superior from the viewpoint of environment or costs.

The gas-absorbing substance of the present invention makes it possible to provide an alloy that exerts a higher absorbing activity particularly on nitrogen and/or oxygen.

The first aspect of the gas-absorbing substance of the invention is characterized by containing at least Li and a solid material having a hardness of 5 or more and by absorbing at least nitrogen and/or oxygen at 25° C. under normal pressure.

With respect to the solid material having a hardness of 5 or more, examples thereof include: Si, B, c-C (diamond), $SiO_2$, SiC, c-BN (cubic boron nitride), $Al_2O_3$, MgO and $TiO_2$.

Other components may be added thereto.

Hardness here refers to 10 steps of Moh's hardness.

With respect to the confirming method for the above-mentioned solid material, although not particularly limited, for example, a method in which peaks of Li and the solid material are confirmed through X-ray diffraction may be used.

The content of the solid material is preferably set in a range of 5 mol % or more to 95 mol % or less. The reason for this range is because, when the solid material becomes 5 mol % or less with respect to 100 mol % of the gas-absorbing substance, it becomes difficult to mix these elements uniformly due to an increase of Li having a high ductility, and because, when it becomes 95 mol % or more, Li having a higher activity is reduced so that the gas-absorbing activity becomes smaller.

The density of the solid material is preferably set to 5 $g/cm^3$ or less. By using the solid material of this type, the density increase is reduced even when the solid material is combined with Li having the density of 0.53 $g/cm^3$, and the amount of nitrogen absorption per unit weight is increased.

Therefore, for example, even when the present gas-absorbing substance is assembled in a product, the weight increase is lowered, with a sufficient amount of absorption of nitrogen or the like being maintained.

The gas-absorbing substance of the present invention, which makes it possible to absorb at least nitrogen and/or oxygen at 25° C. under normal pressure, may absorb gases other than nitrogen or oxygen, for example, hydrogen, water vapor, carbon monoxide, carbon dioxide, nitrogen oxide, sulfur oxide and hydrocarbon. With respect to the gas other than nitrogen or oxygen to be absorbed, no limitation is particularly given.

With respect to the measuring method for the amount of absorption of the present invention, not particularly limited, known methods, such as an absorption capacity method and a weight method, may be utilized as long as absorption of at least nitrogen and/or oxygen is confirmed.

Preferably, the gas-absorbing substance of the present invention is capable of absorbing 1 $cm^3$ or more, preferably 3 $cm^3$ or more, more preferably 5 $cm^3$ or more of nitrogen and/or oxygen per 1 g. With respect to the measurements for the amount of absorption, for example, a partially absorbed gas-absorbing substance is taken out, while it is being absorbed, and the amount of nitrogen absorption may be measured on the gas-absorbing substance, or with respect to a gas-absorbing substance one portion of which has been absorbed or the absorption activity of which has been lost, nitrogen is driven out therefrom by using a heating process or the like so that the amount of absorption of nitrogen per 1 g may be found based upon the amount of nitrogen and the gas-absorbing substance after the heating process.

Absorption here includes sorption to the inside, in addition to adsorption to surface.

The gas-absorbing substance in accordance with the present invention is capable of absorbing at normal temperature or in an atmosphere of about 80° C. or less, under normal pressure or less, in particular, under a low pressure range.

Although not particularly limited, the application mode of the gas-absorption substance includes, for example, modes such as powder, compression-molding, a pellet, a sheet, a thin-film, or charging into another container and deposition onto another substance, although the mode is not particularly limited to these.

The second aspect of the gas-absorbing substance of the present invention is characterized in that the solid material in accordance with the first aspect contains at least an oxide.

Examples of the oxide include $Al_2O_3$, $MgO$, $SiO_2$ and $TiO_2$.

Alternatively, the oxide may be prepared as an oxide containing three or more elements.

The third aspect of the gas-absorbing substance of the present invention is characterized in that the invention relating to the first aspect or the second aspect is designed so that at least one portion of Li has a particle size of 1 mm or less.

With respect to the particle size of 1 mm or less, any particle size may be adopted as long as one portion thereof has a particle size of 1 mm or less, and this fact can be confirmed by using a conventional confirming method. Not particularly limited, the particle size prior to the gas-absorption or the particle size after the gas-absorption may be used.

The fourth aspect of the gas-absorbing substance of the present invention is characterized in that the invention relating to any of the first to the third aspects is designed so that at least Li and at least one portion of a solid material are atomically mixed.

The fact that at least one portion is atomically mixed refers to a state in which at least one portion thereof is made physically inseparable into two kinds of substances. For example, this state refers to a mixed state of substances on atomic levels with respect to one portion of the interface between two kinds of substances; however, the present invention is not intended to be limited by this state.

A gas-absorbing substance in accordance with the fifth aspect of the present invention is characterized in that the invention relating to any of the first to the fourth aspects is designed so that at least Li and a solid material are mixed through a mechanical alloying process.

The mixing process through the mechanical alloying refers to a method of mechanical mixing, and this process is not particularly limited. As a highly active gas-absorbing alloy is manufactured, the mechanical alloying process is preferably carried out in an inert gas, in an atmosphere such as Ar and He, or in a vacuum.

Upon carrying out the mechanical alloying process, carbon may be added in a separate manner, or the process may be carried out in a cooled state, or a slight amount of alcohol or the like is dripped therein, so that adhesion to the container can be prevented.

The following description will discuss the gas-absorbing alloy that is characterized by being composed of at least two kinds of metals that are not allowed to mutually form an intermetallic compound, with a mixing enthalpy of the two kinds of metals being greater than 0 and at least one portion of the two kinds of metals being atomically mixed with each other.

By using metals that are not allowed to mutually form an intermetallic compound, with a mixing enthalpy of the two kinds of metals being greater than 0, and normally have no interaction, it becomes possible to improve the activity in the metals contained therein. Therefore, the reactivity between the metal and the gas is improved to provide a higher gas-absorbing activity.

The reason for this is schematically explained as follows: for example, in a Li—Fe based alloy, an Li atom and an Fe atom do not make a stable chemical coupling; therefore, when these atoms are forcefully made adjacent with each other, each of the atoms has a greater reactivity to try to combine with another third element so that the absorbing activity becomes higher.

The two kinds of metals are mixed with each other in such a degree that at least one portion thereof is atomically mixed with each other; thus, the repulsive force between the metals is further increased, and the activity of the metals contained therein is consequently improved. Therefore, the reactivity between the metal and the gas is improved to provide a higher gas-absorbing activity.

The gas-absorbing alloy of the present invention is preferably composed of at least Li and a transition metal that is not allowed to form an intermetallic compound with Li, with a mixing enthalpy of the two kinds of metals being greater than 0.

Thus, the activity of Li, which makes it possible to absorb nitrogen, can be improved. Consequently, it becomes possible to provide an alloy that exerts a very high gas-absorbing activity on nitrogen that is in general very difficult to be absorbed.

The gas-absorbing alloy of the present invention is preferably formed through a mixing operation by using a mechanical alloying process.

In order to form an alloy by using metals that are not allowed to mutually form an intermetallic compound, with a mixing enthalpy of two kinds of metals being greater than 0, so as to improve the activity, the best suited method is to carry out the mixing operation by using a mechanical alloying process.

The gas-absorbing alloy of the present invention, which is composed of two kinds of metals that are not allowed to mutually form an intermetallic compound, with a mixing enthalpy of the two kinds of metals being greater than 0 and at least one portion of the two kinds of metals being atomically mixed with each other, makes it possible to provide an alloy that exerts a very high activity on gases, such as nitrogen, oxygen, hydrogen, carbon dioxide, carbon monoxide and water vapor, in particular, on nitrogen.

The first aspect of the present invention of the gas-absorbing alloy is characterized by being composed of at least two kinds of metals that are not allowed to mutually form an intermetallic compound, with a mixing enthalpy of the two kinds of metals being greater than 0.

The alloy here refers to a substance constituted by two or more kinds of metals.

The fact that the two metals are not allowed to form an intermetallic compound can be confirmed, for example, by using X-ray diffraction.

For example, one or more elements may be added thereto, as long as at least two kinds of metals are not allowed to form an intermetallic compound, and such one or more elements may form compounds with the above-mentioned metals.

Figure 9:
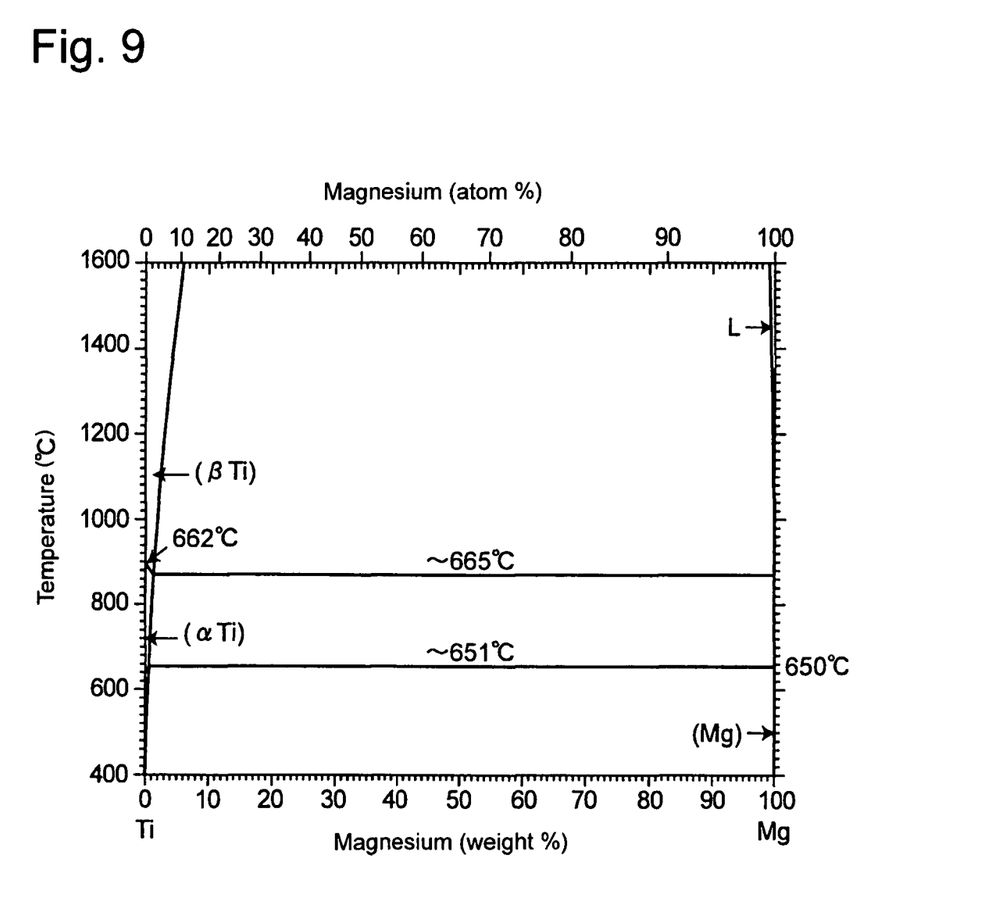
FIG. 9 Mg—Ti phase diagram.

The fact that a mixing enthalpy is greater than 0 may be confirmed, for example, by phase diagram, and, for example, as shown in FIG. 9, the fact is confirmed by lines that are not allowed to intersect each other even when the temperature is raised to a certain degree.

Phase diagrams of kinds of metals having a mixing enthalpy that is 0 or greater include phase diagrams indicating a non-solid solution type as shown in FIG. 9 or a eutectic type.

With respect to gases to be absorbed, although not particularly limited, examples thereof include: nitrogen, oxygen, hydrogen, water vapor, carbon monoxide, carbon dioxide, sulfur oxide and hydrocarbon.

Absorption here includes sorption to inside, in addition to adsorption to surface.

The gas-absorbing alloy in accordance with the present invention, which has a high activity, is capable of absorbing at normal temperature or in an atmosphere of about 80° C. or less, under normal pressure or less, in particular, under a low pressure area.

The application mode of the gas-absorption alloy includes, for example, modes such as powder, a compression-molding, a pellet, a sheet, a thin-film, or charging into another container and deposition onto another substance, although the mode is not particularly limited to these.

The second aspect of the gas-absorbing alloy of the present invention is characterized in that at least one portion between the two kinds of metals is atomically mixed with each other.

The state in which at least one portion is atomically mixed refers to a state in which the two kinds of metals cannot be separated from each other at least at the one portion. For example, this state refers to a mixed state of metals on atomic levels with respect to one portion of the interface between two kinds of metals; however, the present invention is not intended to be limited by this state.

A gas-absorbing alloy in accordance with the third aspect of the present invention is characterized by being composed of a metal that has a nitride-formation enthalpy of smaller than 0 at least at 298K and a second metal that is not allowed to form an intermetallic compound with the above-mentioned metal, with a mixing enthalpy of the two kinds of metals being greater than 0.

Examples of the metal having a nitride-formation enthalpy of smaller than 0 include: Li, Mg, Al, Ca and Si.

A gas-absorbing alloy in accordance with the fourth aspect of the present invention is characterized in that at lease one portion between the two kinds of metals is atomically mixed. The "state in which at least one portion is atomically mixed" refers to the same state as described above.

A gas-absorbing alloy in accordance with the fifth aspect of the present invention is characterized by being composed of at least Li and a transition metal that is not allowed to form an intermetallic compound with Li, with a mixing enthalpy of the two kinds of metals being greater than 0.

Examples of the transition metal having a mixing enthalpy with Li of greater than 0 include: Co, Cr, Cu, Fe, Hf, Mn, Mo, Nb, Ni, Ta, Ti, V, W, Y and Zr.

The gas-absorbing alloy of the present invention, which has a high activity on nitrogen, also exerts a high activity on other gases, such as oxygen, hydrogen, water vapor, carbon monoxide, carbon dioxide, nitrogen oxide, sulfur oxide and hydrocarbon.

The content of the transition metal is preferably set in a range from 5 mol % or more to 95 mol % or less.

When the content of the transition metal becomes 5 mol % or less with respect to 100 mol % of the alloy, it becomes difficult to mix the transition metal with Li uniformly due to an increase of Li having a high ductility, and when it becomes 95 mol % or more, Li having a higher activity is reduced so that the gas-absorbing activity becomes smaller.

A gas-absorbing alloy in accordance with the sixth aspect of the present invention is characterized in that at least one portion between the two kinds of metals is atomically mixed. The "state in which at least one portion is atomically mixed" refers to the same state as described above.

A gas-absorbing alloy in accordance with the seventh aspect of the present invention is characterized in that at least two kinds of metals relating to the first to sixth aspects of the present invention are mixed through a mechanical alloying process.

The mixing process through the mechanical alloying refers to a method of mechanical mixing, and this process is not particularly limited. As a highly active gas-absorbing alloy is manufactured, the mechanical alloying process is preferably carried out in an inert gas, for example, in an atmosphere such as Ar and He.

The present invention provides a gas-absorbing material containing the gas-absorbing alloy and a gas-absorbing substance.

In this manner, by combining the gas-absorbing alloy and the gas-absorbing substance of the present invention that have different gas-absorbing activities, with each other, the one that exerts a higher activity is allowed to quickly absorb the gas immediately after exposure to the gas to be absorbed, while the other that exerts a lower activity thereon is allowed to absorb the gas more slowly; thus, it becomes possible to obtain a gas-absorbing material that is superior in quick-acting function as well as in maintaining the absorbing activity.

A gas-absorbing agent containing the gas-absorbing alloy and the gas-absorbing substance can be manufactured through various methods, such as a method in which the former and the latter are mixed at once, or a method in which the former gas-absorbing alloy and the gas-absorbing substance, which have been preliminarily formed separately, are used in the same atmosphere, or a method in which those having been formed separately are then mixed or the mixture thereof is compression-molded, or a method in which those are respectively pelletized and used in the same atmosphere, or a method in which either one of them is coated with the other.

The absorbing material in accordance with the present invention, which has a high activity, is capable of absorbing at normal temperature or in an atmosphere of about 80° C. or less, under normal pressure or less, in particular, under a low pressure area.

The following description will discuss Embodiments of the present invention. The present invention is not intended to be limited by these Embodiments.

EXAMPLE 1

Embodiment 1

Gas-Absorbing Substance

A gas-absorbing substance in accordance with the present invention is composed of two kinds of substances, that is, Li and a solid material. The solid material is prepared as a material that causes no problems on the environment, etc.

Gas-absorbing substances were prepared by changing the kinds of the solid materials, and evaluated on nitrogen, oxygen and air absorbing processes, and the results thereof are shown in Examples I-1 to I-3.

EXAMPLE I-1

Si was used as a solid material. Li (1 mole) and Si (5 moles) were mixed through a mechanical alloying process by using a planetary ball mill in which stainless balls were used, in an Ar atmosphere so that a gas-absorbing substance (Li—Si) was obtained. The hardness of Si is 6.5, and the density is 2.3 g/cm$^3$.

By mixing through the mechanical alloying process, the two kinds of substances are mixed on nano-levels at the interface thereof; thus, it is considered that the two kinds of substances are atomically mixed at the interface thereof.

It was confirmed that at least one portion of Li was formed into particles of 1 mm or less.

Figure 1:
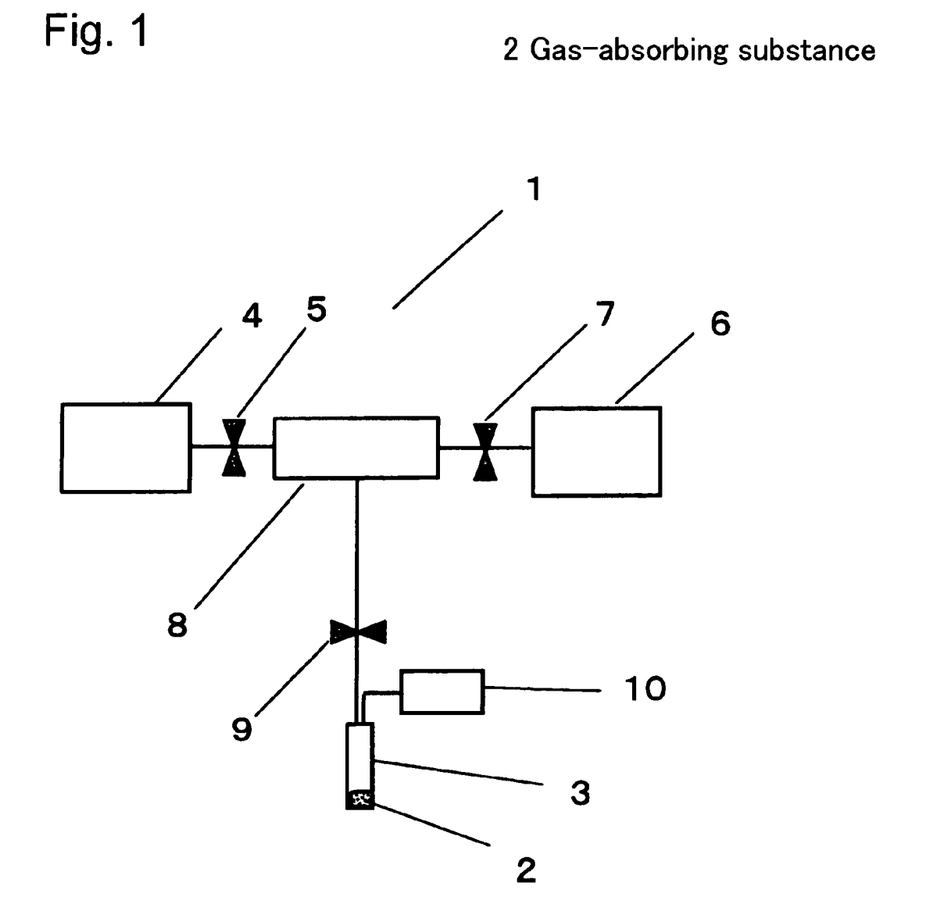
FIG. 1 A schematic block diagram that shows an absorption evaluating device that is used for evaluating absorbing characteristics of a gas-absorbing substance in accordance with an embodiment of the present invention.

The absorbing characteristic of the gas-absorbing substance (Li—Si) in an Ar atmosphere was evaluated by using an absorption-material-evaluating device 1 shown in FIG. 1.

In the absorption-material-evaluation-device 1, a gas cylinder 4 is connected to a gas-supply unit 8 having a predetermined capacity through a first valve 5 and a vacuum pump 6 is also connected thereto through a second valve 7. The gas-supply unit 8 is also connected to a sample tube 3 through a third valve 9. A pressure gauge 10 is connected to the sample tube 3. The gas supply unit 8 is detachably attached to the third valve 9.

First, a gas-absorbing substance 2 was tightly enclosed in the sample tube 3 (not shown) that was in a detached state in an Ar atmosphere, and connected to the gas supply unit 8 with the third valve 9 closed.

With the first valve 5 closed, the second valve 7 was opened and the third valve 9 was then opened so that the inside of the system was evacuated into vacuum. Thereafter, when the inside of the system had been set to a sufficiently low pressure, the third valve 9 and the second valve 7 were closed, with the first valve 5 being opened so that gas is directed to the gas supply unit 8 from the gas cylinder 4 so as to set the inside of the sample tube 3 to a predetermined pressure, and the first valve 5 was closed. Then, the third valve 9 was opened, and the gas-absorbing substance 2 was exposed to the gas so that the gas-absorbing characteristic was evaluated.

Figure 2:
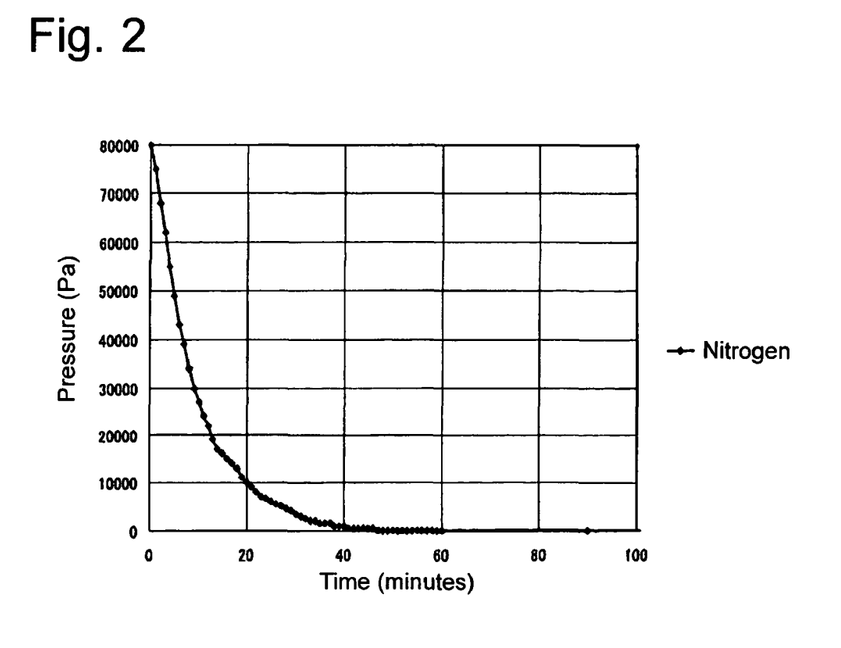
FIG. 2 A characteristic drawing that shows absorbing characteristics on nitrogen that is exerted by a gas-absorbing substance when nitrogen is injected to a sample tube so as to be set to about 80000 Pa therein in Example I-1 of the present invention.

FIG. 2 shows a relationship between time and pressure variation when nitrogen was introduced so that the inside of the sample tube was set to about 80000 Pa.

As shown in FIG. 2, the pressure became virtually 0 Pa in about 40 minutes.

EXAMPLE I-2

Al$_2$O$_3$ was used as a solid material. Li (1 mole) and Al$_2$O$_3$ (1.1 moles) were mixed through a mechanical alloying process by using a vibration ball mill in which stainless balls were used, in an Ar atmosphere so that a gas-absorbing substance (Li—Al$_2$O$_3$) was obtained. The hardness of Al$_2$O$_3$ is 9, and the density is 3.97 g/cm$^3$.

It was confirmed that at least one portion of Li was formed into particles of 1 mm or less.

The gas-absorbing substance (Li—Al$_2$O$_3$) was tightly enclosed in the sample tube 3 in an Ar atmosphere, and evaluated on its absorbing characteristic by using the absorption material evaluation device 1 in the same manner as Example I-1.

Figure 3:
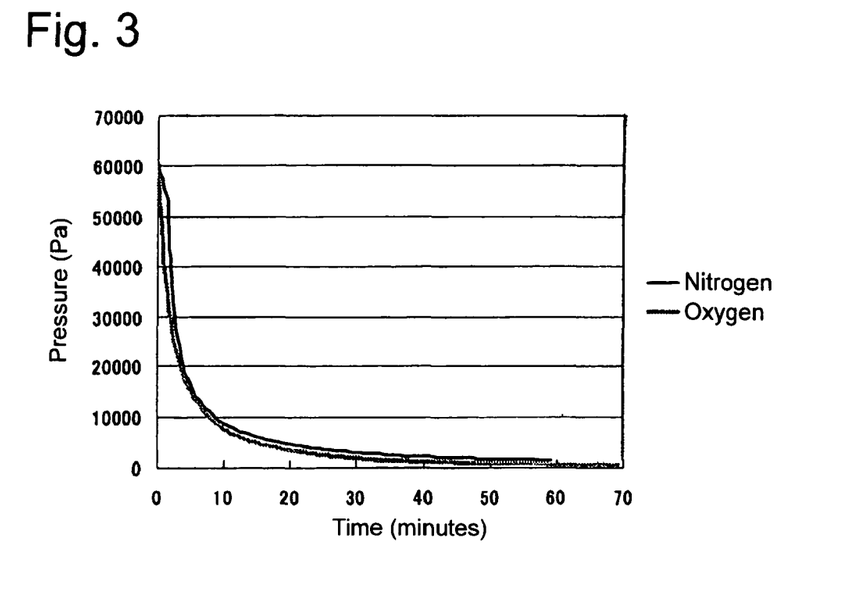
FIG. 3 A characteristic drawing that shows absorbing characteristics on nitrogen that is exerted by a gas-absorbing when nitrogen is injected to a sample tube so as to be set to about 60000 Pa therein and absorbing characteristics on oxygen that is exerted by a gas-absorbing substance when oxygen is injected to a sample tube so as to be set to about 60000 Pa, in Example I-2 of the present invention.

FIG. 3 shows a relationship between time and pressure variation when nitrogen was introduced so that the inside of the sample tube was set to about 60000 Pa.

It was confirmed that in the initial state of absorption, the absorbing rate was fast to provide a high activity, even though the initial pressure was low, in comparison with Example I-1.

FIG. 3 shows a relationship between time and pressure variation when oxygen was introduced so that the inside of the sample tube was set to about 60000 Pa.

Figure 4:
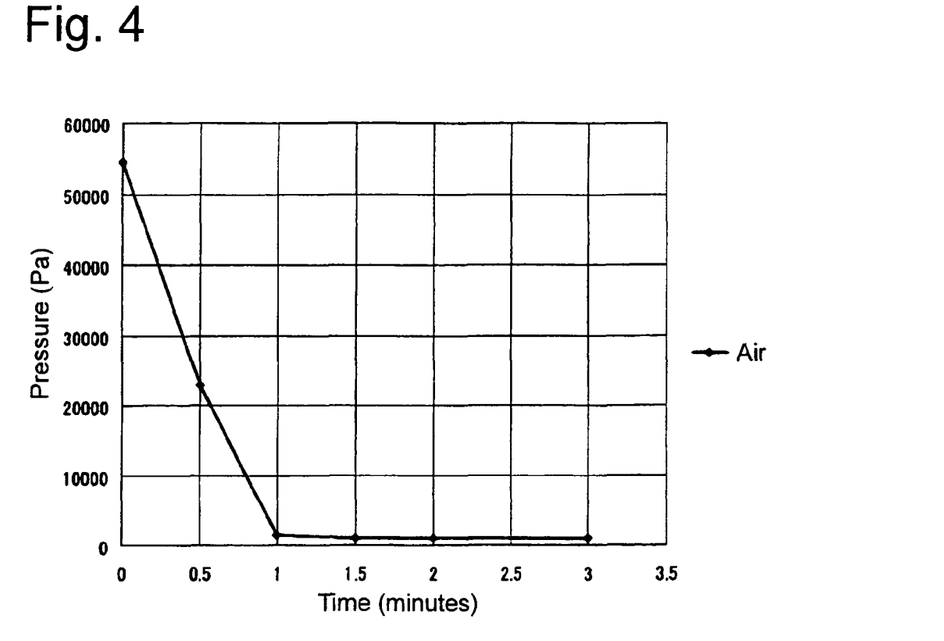
FIG. 4 A is a characteristic drawing that shows absorbing characteristics on air that is exerted by a gas-absorbing substance when ambient air is injected to a sample tube so as to be set to about 55000 Pa therein in Example I-2 of the present invention.

Ambient air (63% in humidity) was introduced into the sample tube through the first valve 5 so as to be set to about 55000 Pa. FIG. 4 shows the relationship between time and pressure at this time.

Moreover, in order to measure the amount of absorption, the gas-absorbing substance (Li—Al$_2$O$_3$) was evaluated on the nitrogen-oxygen absorption amount by using an Autosorb-1-C made by Quantachrome Corporation.

Through the evaluation of the nitrogen absorption amount, it was confirmed that the amount of nitrogen absorption was 21.98 cm$^3$/gSTP under about 5300 Pa, and was 30.45 cm$^3$/gSTP under about 92000 Pa. Through the evaluation of the oxygen absorption amount, it was confirmed that the amount of oxygen absorption was 1.99 cm$^3$/gSTP under about 900 Pa, and was 6.31 cm$^3$/gSTP under about 92000 Pa.

EXAMPLE I-3

MgO was used as a solid material. Li (1 mole) and MgO (2 moles) were mixed through a mechanical alloying process by using a vibration ball mill in which stainless balls were used so that a gas-absorbing substance (Li—MgO) was obtained. The hardness of MgO is 5.6, and the density is 3.6 g/cm$^3$.

It was confirmed that at least one portion of Li was formed into particles of 1 mm or less.

The gas-absorbing substance (Li—MgO) was tightly enclosed in a sample tube 3 in an Ar atmosphere, and the absorbing characteristic thereof was evaluated by using an absorption-material-evaluating device 1 in the same manner as Example I-1.

Figure 5:
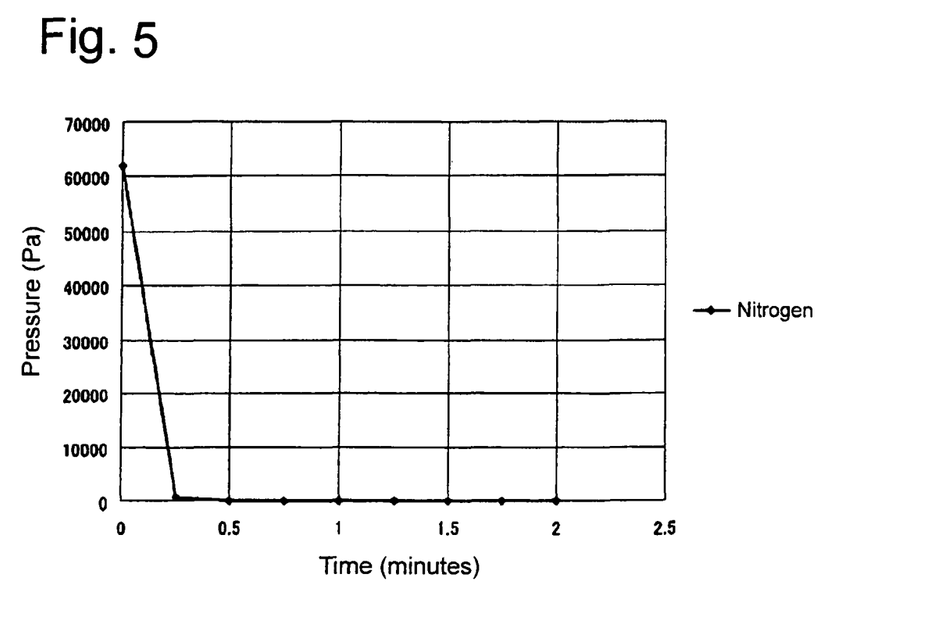
FIG. 5 A characteristic drawing that shows absorbing characteristics on nitrogen that is exerted by a gas-absorbing substance when nitrogen is injected to a sample tube so as to be set to about 60000 Pa therein in Example I-3 of the present invention.

FIG. 5 shows a relationship between time and pressure when nitrogen was introduced so that the inside of the sample tube was set to about 60000 Pa.

Figure 6:
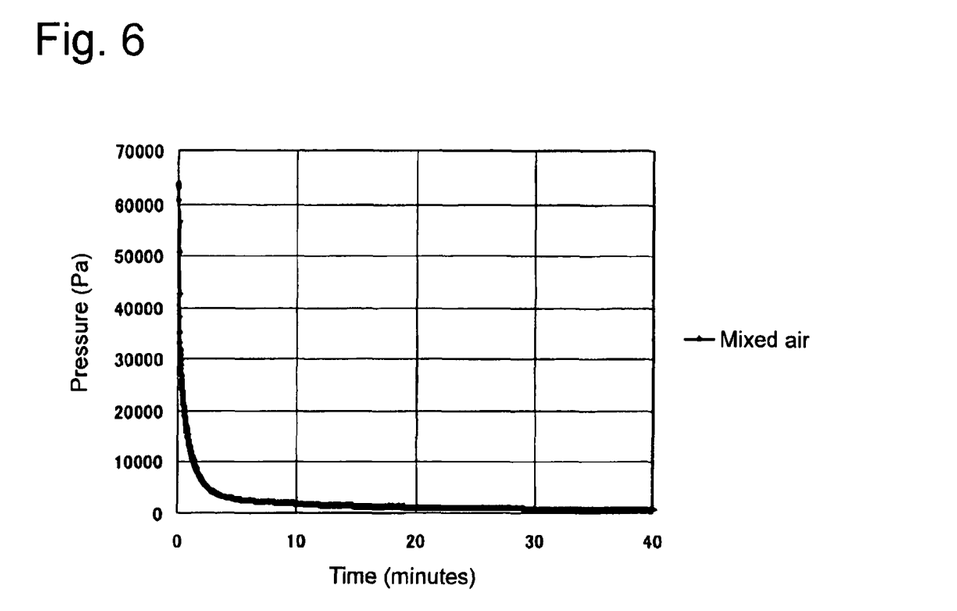
FIG. 6 A characteristic drawing that shows absorbing characteristics on a mixed air that is exerted by a gas-absorbing substance when a mixed air composed of about 80% of nitrogen and about 20% of oxygen is injected to a sample tube so as to be set to about 65000 Pa therein in Example I-3 of the present invention.

FIG. 6 shows a relationship between time and pressure when a mixed air containing about 80% of nitrogen and about 20% of oxygen was introduced so that the inside of the sample tube was set to about 65000 Pa.

Figure 7:
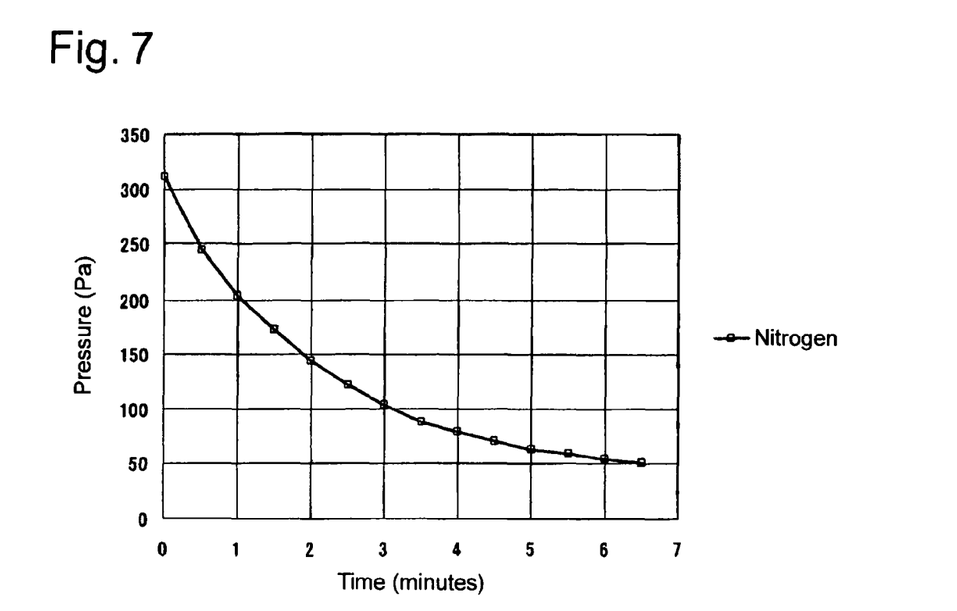
FIG. 7 A characteristic drawing that shows absorbing characteristics on nitrogen that is exerted by a gas-absorbing substance when nitrogen is injected to a sample tube so as to be set to about 310 Pa therein in Example I-3 of the present invention.

FIG. 7 shows a relationship between time and pressure variation when nitrogen was introduced so that the inside of the sample tube was filled with nitrogen of about 310 Pa.

As shown in FIG. 7, the pressure became 50 Pa in about 6.5 minutes and had a tendency to further drop.

Moreover, in order to measure the amount of absorption, the gas-absorbing substance (Li—MgO) was evaluated on the nitrogen-oxygen absorption amount by using an Autosorb-1-C made by Quantachrome Corporation.

Through the evaluation of the nitrogen absorption amount, it was confirmed that the amount of nitrogen absorption was 5.44 cm$^3$/gSTP under about 45 Pa, and was 26.64 cm$^3$/gSTP under about 92000 Pa. Through the evaluation of the oxygen absorption amount, it was confirmed that the amount of oxygen absorption was 1.94 cm$^3$/gSTP under about 45 Pa, and was 11.93 cm$^3$/gSTP under about 92000 Pa.

EXAMPLE I-4

MgO was used as a solid material. Li (1 mole) and MgO (1 mole) were mixed through a mechanical alloying process by using a vibration ball mill in which stainless balls were used so that a gas-absorbing substance (Li—MgO) was obtained.

The gas-absorbing substance (Li—MgO) was tightly enclosed in a sample tube 3 in an Ar atmosphere, and the absorbing characteristic thereof was evaluated by using an absorption-material-evaluating device 1 in the same manner as Example I-1.

Figure 8:
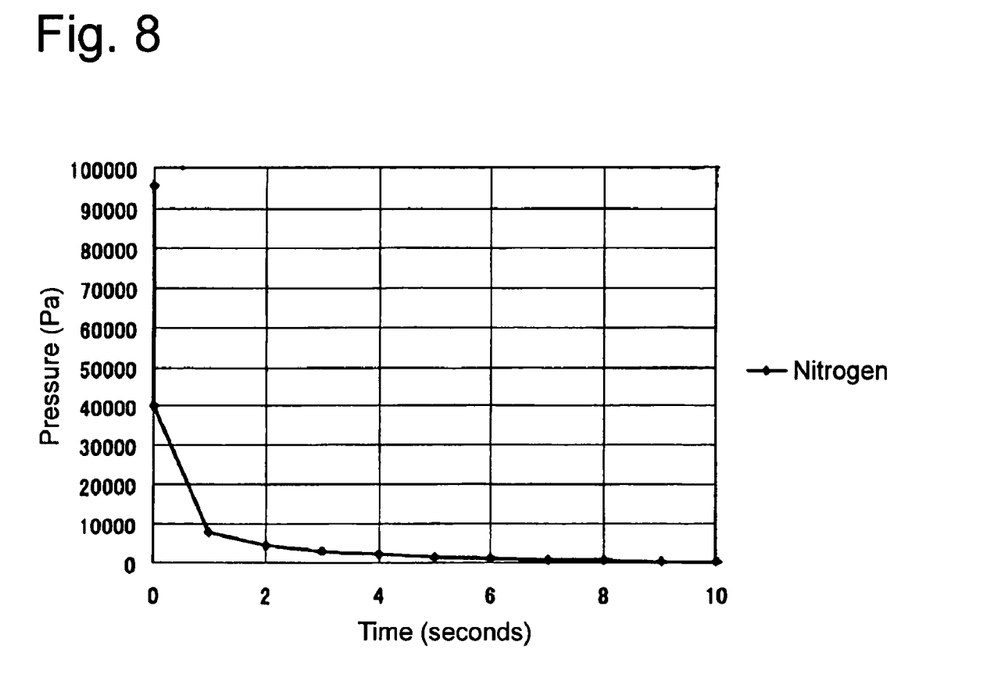
FIG. 8 A characteristic drawing that shows absorbing characteristics on nitrogen that is exerted by a gas-absorbing substance when nitrogen is injected to a sample tube so as to be set to about 96000 Pa therein in Example I-4 of the present invention.

FIG. 8 shows a relationship between time and pressure when nitrogen was introduced so that the inside of the sample tube was set to about 96000 Pa.

It was confirmed that simultaneously as exposure to nitrogen, the substance absorbed nitrogen quickly.

EXAMPLE I-5

SiO$_2$ was used as a solid material. Li (1 mole) and SiO$_2$ (3 moles) were mixed through a mechanical alloying process by using a planetary ball mill in which stainless balls were used, in an Ar atmosphere so that a gas-absorbing substance (Li—SiO$_2$) was obtained. The hardness of SiO$_2$ is 6.5, and the density is 2.3 g/cm$^3$.

By mixing through the mechanical alloying process, the two kinds of substances are mixed on nano-levels at the interface thereof; thus, it is considered that the two kinds of substances are atomically mixed at the interface thereof.

The gas-absorbing substance (Li—SiO$_2$) was tightly enclosed in a container having a capacity of 20 cm$^3$, and the container was evacuated into vacuum, and when the inside of the container was then set to a nitrogen atmosphere of about 0.05 MPa, the atmospheric pressure became 15 Pa from 0.05 MPa.

At this time, the gas-absorbing substance (Li—SiO$_2$) absorbed nitrogen of about 12 cm$^3$ per 1 g.

The following description will discuss Comparative Examples to the gas-absorbing substance of Embodiment 1 of the present invention.

COMPARATIVE EXAMPLE I-1

An attempt was made to carry out a mechanical alloying process on pure Li substance as the gas-absorbing substance; however, the substance, as it was, was not uniformly segmentalized by the mechanical alloying process.

COMPARATIVE EXAMPLE I-2

By using Li having a particle size of about 1 cm as the gas-absorbing substance, the absorbing characteristic of Li was evaluated. The inside of the sample tube was set to about 80000 Pa of nitrogen. As a result, the pressure started to decrease after a lapse of 2 hours.

COMPARATIVE EXAMPLE I-3

Li (1 mole) and Au (5 moles) were subjected to the mechanical alloying process as a gas-absorbing substance; however, these were not segmentalized uniformly. The hardness of Au is 2.5, and the density thereof is 19.3 g/cm$^3$.

The absorbing characteristic was evaluated by the absorption-material-evaluating device 1 in the same method as Example I-1. When the inside of the sample tube was set to a nitrogen atmosphere at about 50000 Pa, the atmospheric pressure was slightly reduced; however, a large-scale reduction was not observed.

Embodiment 2

Gas-Absorbing Alloy

The gas-absorbing alloy of the present invention is composed of metal a and metal b of two kinds. These metals are the ones that cause no adverse effects on the environment, etc.

Examples II-1 and II-2 show the results of evaluation on gas-absorbing alloys formed by changing the kinds of metals. The evaluation was carried out by placing each of the gas-absorbing alloys still standing in a tightly-closed system under a nitrogen atmosphere of about 0.08 MPa so that the pressure variation in the system was observed.

EXAMPLE II-1

Mg was used as metal a and Ti was used as metal b. Mg and Ti were mixed through a mechanical alloying process by using a ball mill in an Ar atmosphere.

The mixing enthalpy was confirmed to be greater than 0 from the shape of phase diagram of Mg—Ti of FIG. 9.

Normally, these metals fail to interact with each other even if the temperature is raised; however, these are forced to be mixed with each other by using the mechanical alloying process. It is considered that these can be mixed with each other because the metals are mixed with each other on nano-levels at the interface of the two kinds of metals so that the two kinds of metals are atomically mixed at the interface.

When Mg—Ti was placed still in a tightly-closed system in a nitrogen atmosphere of about 0.08 MPa, the atmospheric pressure was decreased from 0.08 MPa to 10 Pa.

EXAMPLE II-2

Li was used as metal a and Fe was used as metal b. Li and Fe were mixed through a mechanical alloying process by using a ball mill in an Ar atmosphere.

Figure 10:
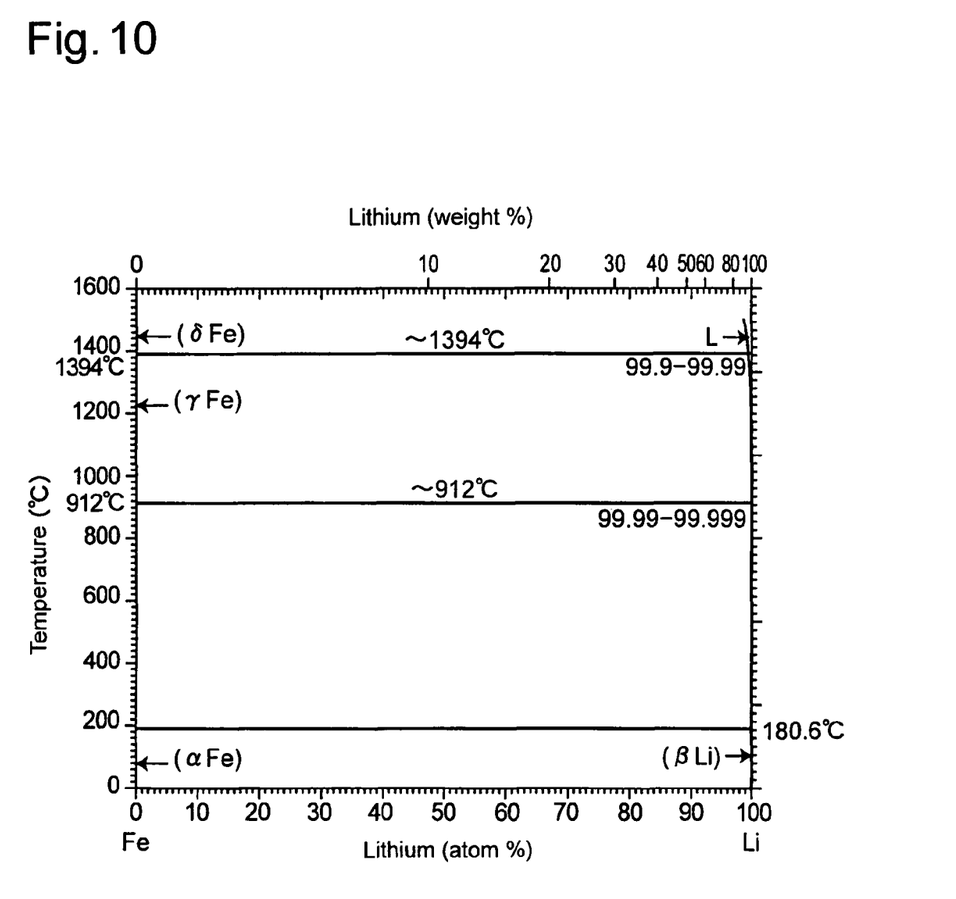
FIG. 10 Li—Fe phase diagram.

The mixing enthalpy was confirmed to be greater than 0 from the shape of phase diagram of Li—Fe of FIG. 10.

Normally, these metals fail to interact with each other even if the temperature is raised; however, these are allowed to be mixed with each other by using the mechanical alloying process.

When Li—Fe was placed still in a tightly-closed system in a nitrogen atmosphere of about 0.08 MPa, the atmospheric pressure was changed from 0.08 MPa to 6 Pa.

The following description will discuss Comparative Example to the gas-absorbing alloy of Embodiment 2 of the present invention.

COMPARATIVE EXAMPLE II-1

Figure 11:
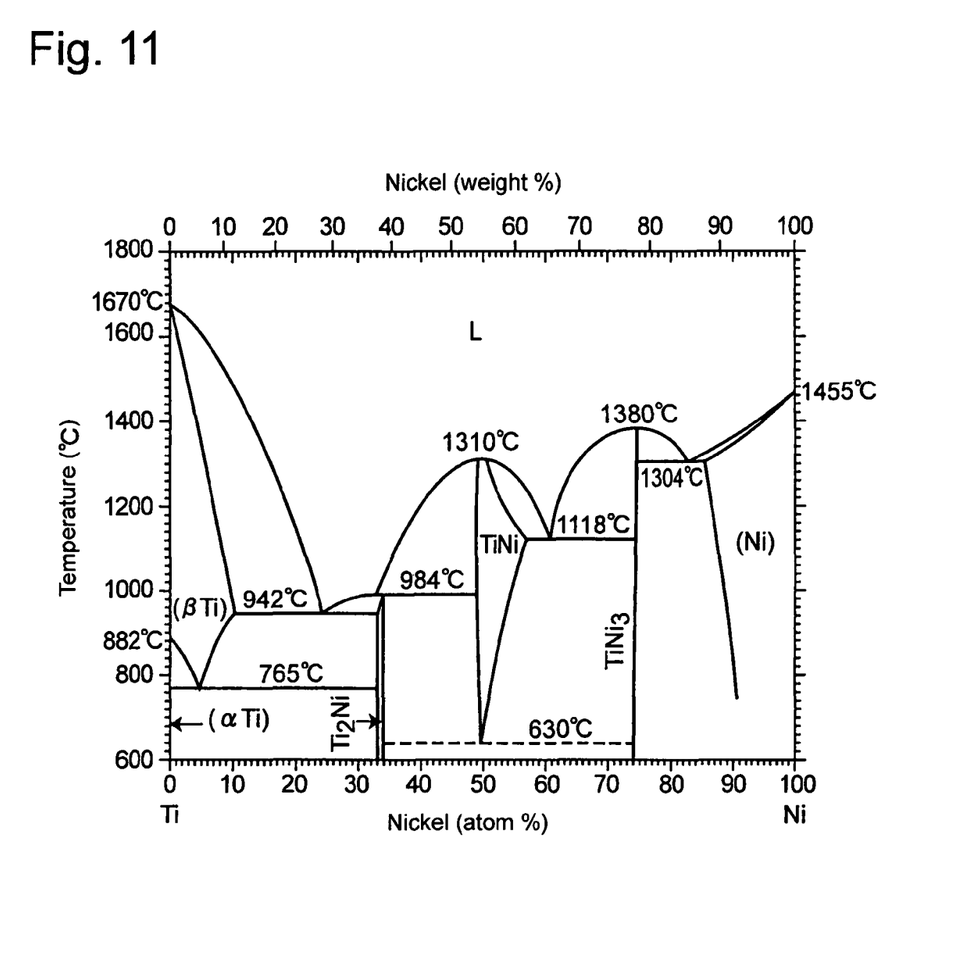
FIG. 11 Ni—Ti phase diagram.

A Ni—Ti alloy was used as an alloy for a Comparative Example. Ni and Ti were mixed through a mechanical alloying process by using a ball mill in an Ar atmosphere. FIG. 11 shows phase diagram of Ni—Ti. FIG. 11 indicates that the Ni—Ti alloy forms an intermetallic compound.

When Ni—Ti was placed still in a tightly-closed system in a nitrogen atmosphere of about 0.08 MPa, virtually no pressure reduction occurred.

INDUSTRIAL APPLICABILITY

As described above, the gas-absorbing substance etc. in accordance with the present invention has a high gas-absorbing activity and, in particular, exerts a high absorbing function on nitrogen or oxygen so that it can be applied to various fields, such as removing gas from a fluorescent light, maintaining vacuum upon heat insulating or the like, eliminating trace gases from a rare gas, and separating gases.

The invention claimed is:

1. A gas-absorbing substance, comprising:
   at least lithium metal and a solid material having a hardness of 5 or more selected from the group consisting of Si, B, c-C (diamond), $SiO_2$ c-BN (cubic boron nitride), $Al_2O_3$, MgO and $TiO_2$,
   said gas-absorbing substance not containing Ba and absorbing at least nitrogen and/or oxygen at 25° C. under normal pressure,
   wherein at least the lithium metal and one portion of the solid material are atomically mixed.

2. The gas-absorbing substance according to claim 1, wherein the solid material contains at least an oxide.

3. The gas-absorbing substance according to claim 1, wherein at least one portion of Li is made to have a particle size of 1 mm or less.

4. The gas-absorbing substance according to claim 1, wherein
   at least and the solid material are mixed through a mechanical alloying process.

5. A gas-absorbing substance comprising:
   at least lithium metal and a solid material having a hardness of 5 or more and a density of 4 g/cm$^3$ at 25° C.,
   said gas-absorbing substance not containing Ba and being capable of absorbing 5 cm$^3$/g or more of nitrogen under normal pressure,
   wherein at least the lithium metal and one portion of the solid material are atomically mixed.

* * * * *